United States Patent [19]

Zinn et al.

[11] Patent Number: 4,699,588
[45] Date of Patent: Oct. 13, 1987

[54] METHOD AND APPARATUS FOR CONDUCTING A PROCESS IN A PULSATING ENVIRONMENT

[75] Inventors: Ben T. Zinn, Atlanta; Brady R. Daniel, Stone Mountain, both of Ga.

[73] Assignee: Sonotech, Inc., Atlanta, Ga.

[21] Appl. No.: 836,997

[22] Filed: Mar. 6, 1986

[51] Int. Cl.$^4$ .................. F27B 15/00; F27D 7/00; F23C 11/04
[52] U.S. Cl. ............................... 432/58; 431/1; 431/114; 432/25; 432/99; 110/244
[58] Field of Search .............. 432/58, 59, 25, 99, 432/102; 431/114, 1; 110/244

[56] References Cited

U.S. PATENT DOCUMENTS

| | | | |
|---|---|---|---|
| 3,618,655 | 11/1971 | Lockwood | 159/4 E |
| 3,848,550 | 11/1974 | Bower | 110/244 |
| 3,855,951 | 12/1974 | Giles | 110/244 |
| 3,861,330 | 1/1975 | Santoleri | 110/244 |
| 3,887,326 | 6/1975 | Townley | 432/99 |
| 4,092,095 | 5/1978 | Straitz, III | 431/114 |
| 4,168,948 | 9/1979 | Okamoto et al. | 431/114 |
| 4,417,868 | 11/1983 | Putnam | 431/114 |
| 4,439,134 | 3/1984 | Olsson | 431/114 |
| 4,529,377 | 7/1985 | Zinn et al. | 432/58 |
| 4,599,955 | 7/1986 | Hopworth et al. | 110/265 |
| 4,624,635 | 11/1986 | Gray et al. | 432/58 |
| 4,637,794 | 1/1987 | Gray et al. | 432/58 |
| 4,640,682 | 2/1987 | Gray et al. | 432/58 |

OTHER PUBLICATIONS

Hirose, et al., "Application of Pulsating Combustion to a Radiant Tube", *Proceedings of the 5th International Flame Research Foundation Members Conference*, May 1978.

Katsnel'son, et al., "An Experimental Study of Pulsating Combustion", *Teploenergetica* 16, 1:3-6, 1969.

F. H. Reynst, "Pulsating Firing for Steam Generators", *Pulsating Combustion*, 1953.

B. T. Zinn, "Pulsating Combustion", *Mechanical Engineering*, Aug. 1985, pp. 36-41.

"Advanced Combustion Methods", F. J. Weinberg, F.R.S., Ed.; Academic Press (1986), (title page and table of contents only).

"Combustion Instability in Liquid Propellant Rocket Motors", Aeronautical Engineering Report No. 550, by F. H. Reardon, Princeton University (Jun. 1961) (Ph.D. Thesis).

*Primary Examiner*—Henry C. Yuen
*Attorney, Agent, or Firm*—Jones, Askew & Lunsford

[57] ABSTRACT

An improved pulsating processing system for thermal, chemical, and physical processes which employs nonlongitudinal acoustic modes in a processing chamber to enhance the processing. An acoustically resonant processing chamber is provided as the processing vessel. A frequency tunable pulse combustor or other selectively variable frequency acoustic exciter is positioned to excite natural nonlongitudinal acoustic modes in the processing chamber. Material introduced into the processing chamber is thereby subjected to nonlongitudinal acoustic pulsations while the material is being processed. Also disclosed is an improved frequency and amplitude tunable pulse combustor which may be employed to excite the natural acoustic modes in the processing chamber. One disclosed embodiment is a system for drying a slurry of material such as kaolin. The nonlongitudinal acoustic excitations in the system result in improved moisture removal and particle heating. Also disclosed are other various modulation devices for exciting longitudinal and nonlongitudinal natural acoustic modes.

50 Claims, 26 Drawing Figures

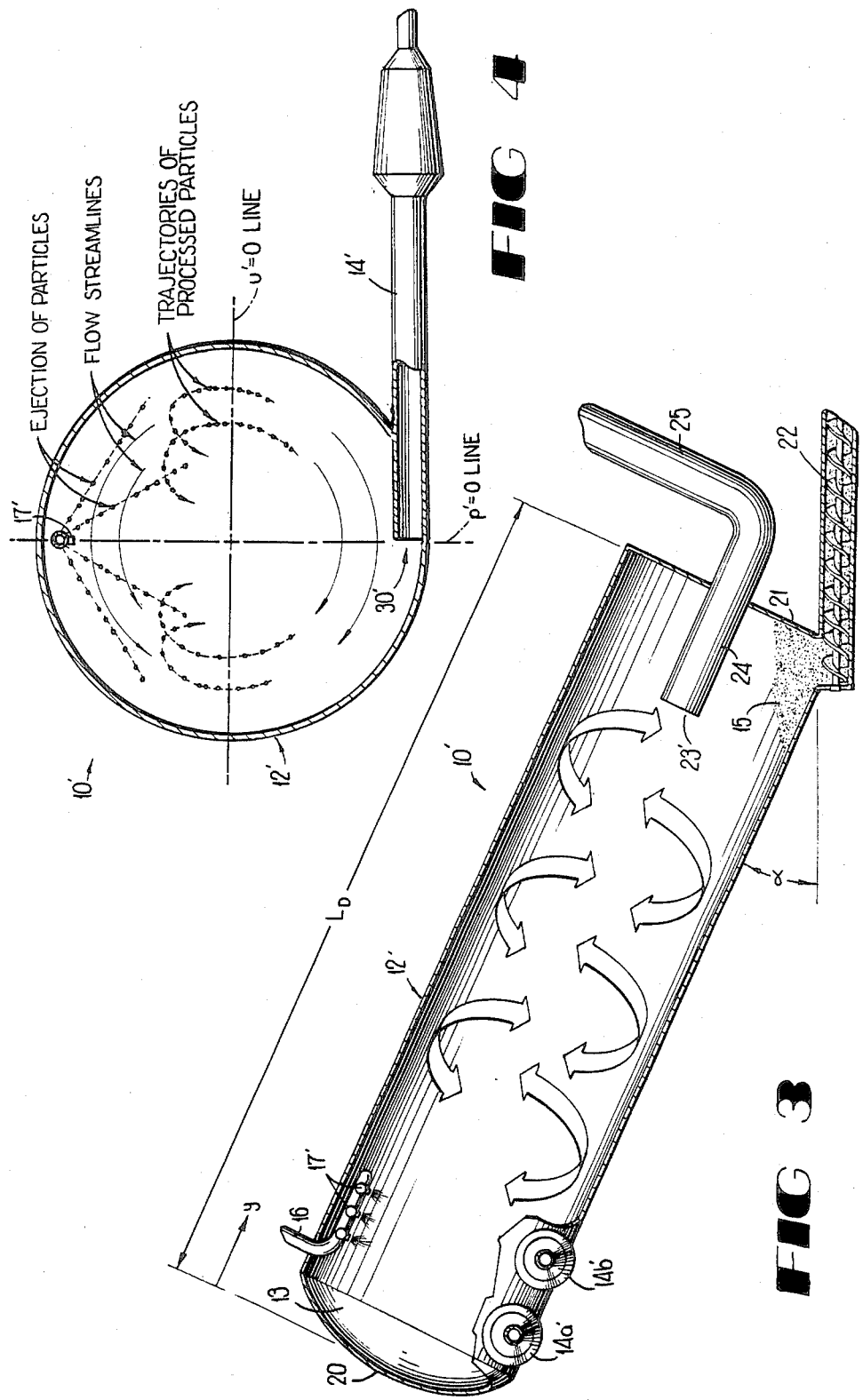

PURELY RADIAL MODES
(FIRST)

$S_{0,1} = 3.8317$

PURELY RADIAL MODES
(SECOND)

$S_{0,2} = 7.0156$

FIRST LONGITUDINAL MODE

SECOND LONGITUDINAL MODE

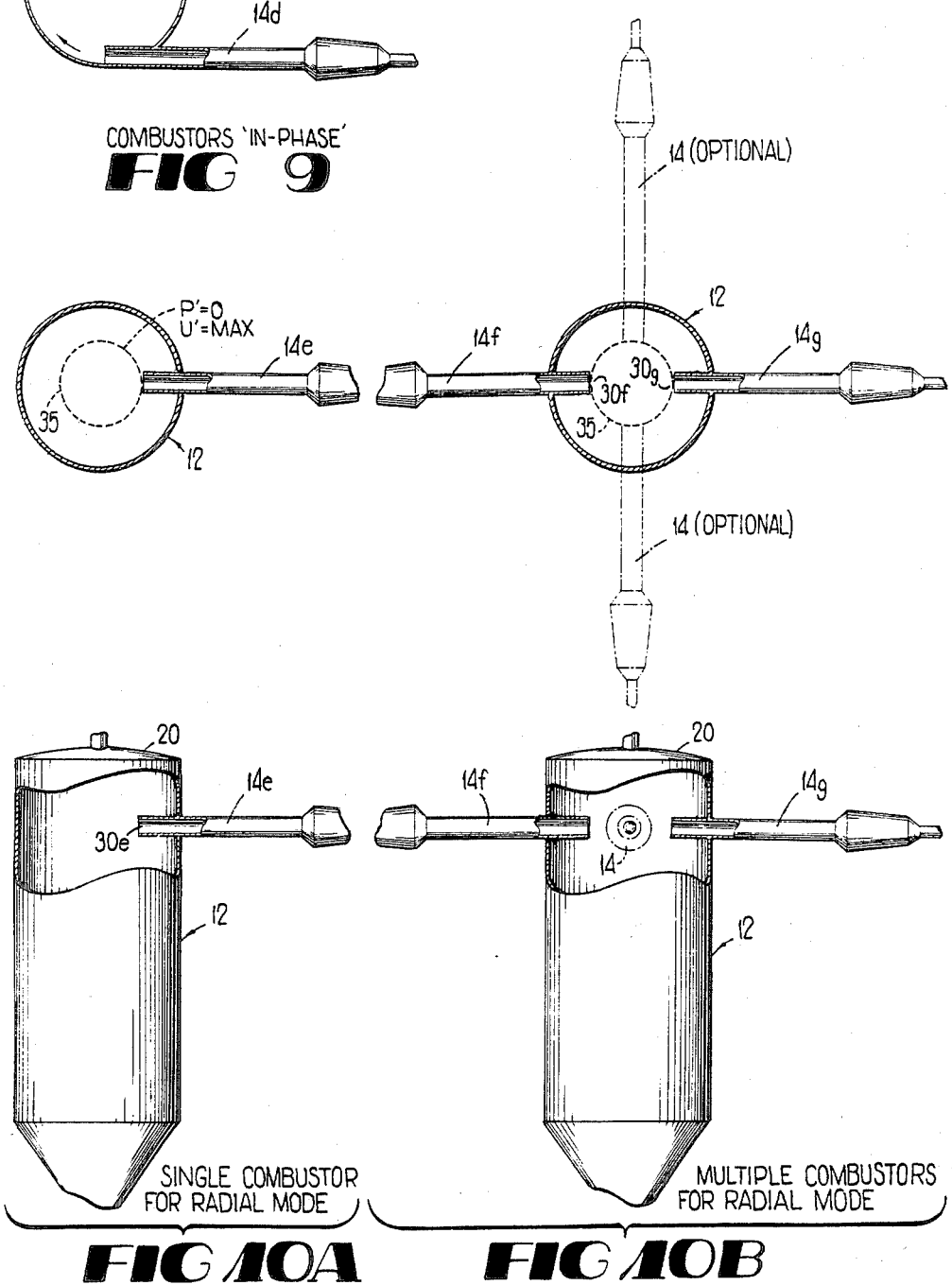

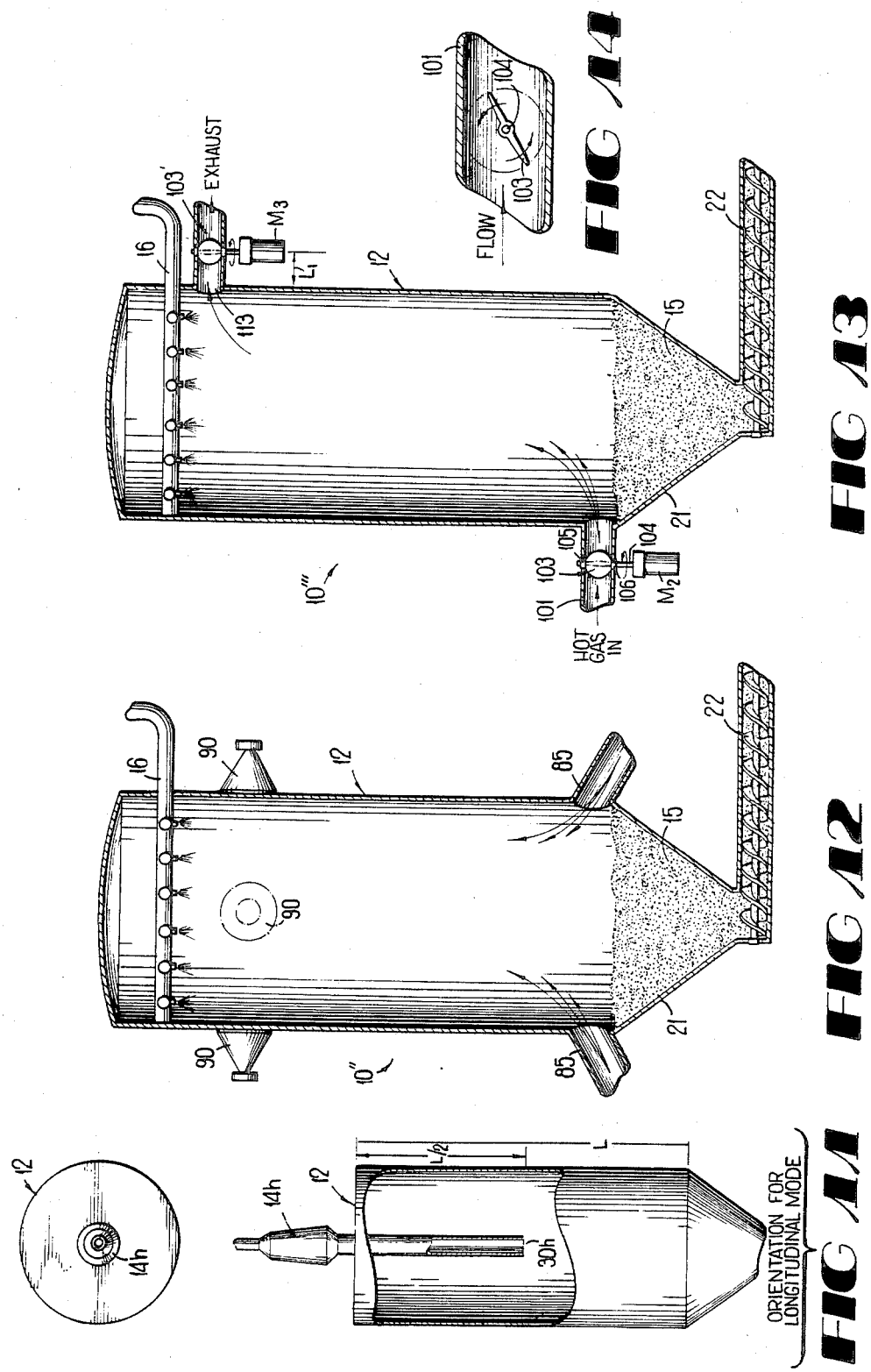

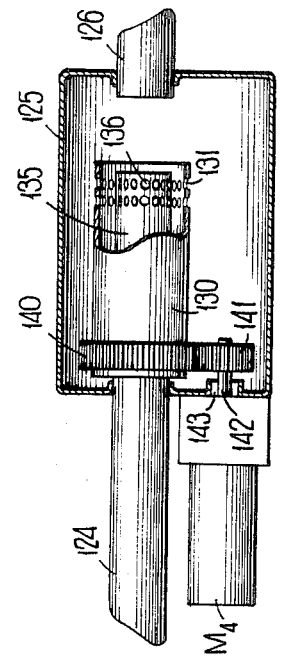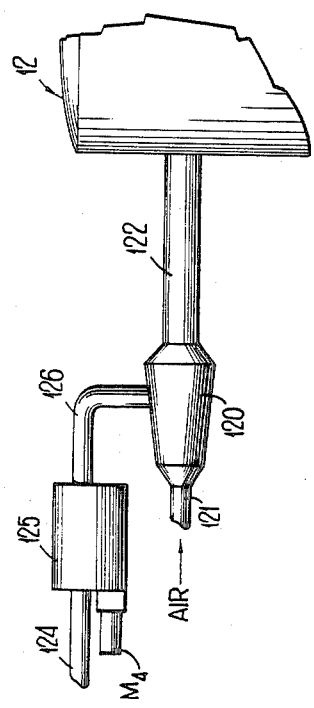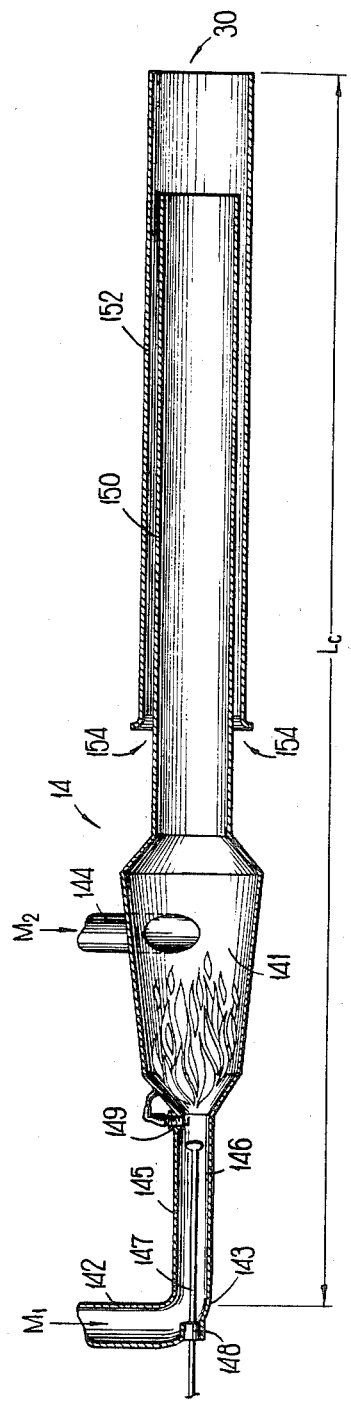

METHOD AND APPARATUS FOR CONDUCTING A PROCESS IN A PULSATING ENVIRONMENT

TECHNICAL FIELD

The present invention relates generally to pulse combustion and acoustics, and relates more specifically to a use of natural nonlongitudinal acoustic modes in a processing chamber induced by pulsating sources such as pulse combustors, acoustic drivers, fuel and exhaust modulation, and the like, to enhance a chemical, thermal or physical process. The present invention also relates to an improved tunable pulse combustor apparatus which can be used as an acoustic excitation means.

BACKGROUND

In many industrial chemical, thermal and physical processing systems, burners are used to produce gas streams having specific temperatures and compositions for a variety of applications involving momentum, heat and/or mass transfer processes. The costs of many of these material processing applications could be reduced if practical means for enhancing the rates of momentum, heat and mass transfer could be found. There is evidence in the prior art that the presence of pulsations in a gas flow results in large increases in rates of momentum, heat and mass transfer processes.

Pulse combustors are known in the art as highly efficient sources of high temperature pulsating gas streams for heaters, boilers, and the like. Consequently, operational and capital investment costs of many industrial processes could be reduced if steady state burners commonly employed in such systems were replaced by pulse combustors which produce pulsating flows having the required thermal loads, temperature and compositions.

However, prior to the present invention pulse combustors were not optimally used in various industrial processes such as drying, calcining, heating and the like. Furthermore, prior to the present invention it has not been believed that pulse combustors could be designed to possess large turndown ratios, operate efficiently over wide ranges of fuel/air ratios and possess capabilities for controlling the amplitudes and frequencies of their pulsations. For example, in one prior art pulse dryer presently used for drying a slurry of kaolin, the slurry of material to be dried is injected directly into the tail pipe of a pulse combustor a short distance upstream of the pulse combustor exit plane. Upon leaving the pulse combustor, the pulsating flow and injected material enter a primary cyclone or drying chamber. The injection of material into the combustor tail pipe interferes with the combustor operation by adversely affecting its acoustic characteristics. This, in turn, limits the amount of material which can be dried and worsens the combustion process by decreasing the combustor capacity to ingest combustion air and achieve adequate mixing between the fuel and air. This results in incomplete combustion and undesirable soot formation in the combustor which adversely affects the properties of dried material, such as kaolin. Moreover, in this system the pulsations from the pulse combustor are damped out in the drying chamber, and no advantage whatsoever is taken of the natural acoustic characteristics of the drying chamber.

Other prior art material drying systems are known to use pulse combustors. In U.S. Pat. No. 3,618,655 to Lockwood, a paste or slurry of material to be dried is introduced into the exhaust pipe of a pulse jet engine, and the partly dried particles are then dispensed into a tank having vortices of gas at a substantially lower temperature than that found in the pulse jet exhaust. This structure is similar to the above-described kaolin drying system, and also appears unconcerned with the natural acoustic characteristics of the drying volume. In addition, there is a risk of overheating (with resultant burning of organic materials) in this type system, since the material is injected directly into the hot gas flow. Also, the system uses self aspirating pulse combustors which have limited ranges of operating conditions.

It is also known in the art to synchronize an oscillation-radiation chamber of a furnace with a pulsating combustion chamber. For example, in the papers of F. H. Reynst, there is described a system which employs a plurality of pulse combustors to excite a longitudinal acoustic mode inside a furnace chamber. By increasing or shortening the length of the oscillating column in the pulse combustors, the frequency is altered, thereby altering the oscillation induced in the radiation chamber. This system, however, appears limited to excitation of longitudinal acoustic modes in the oscillation-radiation furnace chamber. Moreover, the problems encountered in material processing environments, such as temperature control and material drying time, are much more critical than in furnace applications, so that purely longitudinal oscillations are only of limited interest.

It is also known in the art that transverse or "sloshing" type acoustic oscillations can be excited in cylindrical chambers and combustors. For example, the phenomenon of transverse oscillations was observed in studies of transverse instabilities in liquid fuel rocket motors.

Prior to the present invention, however, there has been no successful integration of pulse combustors, or other acoustic excitation means, with a processing chamber wherein nonlongitudinal acoustic oscillations such as transverse oscillations or three-dimensional oscillations have been utilized to improve the rates of heat, mass, and momentum exchange between the processed material and processing medium. Also, there has been no successful integration of acoustic excitation means other than pulse combustors to excite longitudinal acoustic oscillations to improve the heat, momentum and mass transfer rates in the processing chamber.

SUMMARY OF THE INVENTION

The present invention overcomes the above-described and other problems in prior art material and other processing systems by taking advantage of the natural nonlongitudinal acoustic modes of a processing chamber. Briefly described, the present invention comprises an improved pulsating material processing system which employs natural nonlongitudinal acoustic modes of a processing chamber to enhance the processing of the material by improving the rates of heating, mixing and mass transfer, temperature control, and control of material drying time. The present invention is useful in both chemical, thermal and physical material processing systems, such as calciners, industrial dryers, and boilers.

In preferred embodiments of the present invention, an acoustically resonant processing chamber is provided for processing material introduced into the processing chamber. A combustor is provided for introducing a flow of heated gases into the processing chamber to process material introduced into the processing chamber. If necessary, cold dilution air is added to control the processing chamber temperature. Finally, means for exciting at least one natural nonlongitudinal acoustic mode in the processing chamber is provided so that material introduced into the processing chamber is subjected to nonlongitudinal acoustic pulsations while the material is being processed. Advantageously, the rates of heat, mass, and momentum transfer to and from the material are improved by the subjection of the processed material to these nonlongitudinal acoustic pulsations.

More particularly described, in the present invention particular nonlongitudinal modes such as tangential, radial, tangential-radial, and three-dimensional modes are selectively excited by proper positioning of an acoustic exciter which is frequency tunable. These modes, which may include any transverse or three dimensional mode of the processing system, may be selected in order to optimize certain parameters of the process such as drying or chemical reaction rates or to increase the length of the path of travel of material in the processing chamber. In the preferred embodiments, the frequency tunable acoustic exciter is a tunable pulse combustor, although other equally suitable exciters are disclosed.

In order to derive maximum benefit from these nonlongitudinal acoustic oscillations, the acoustic exciter must be tuned to one or more of the natural nonlongitudinal acoustic modes of the processing chamber. Various means for tuning to these natural modes are provided. In various enbodiments disclosed, the tuning to the processing chamber is effectuated by modulating the flow of fuel to the combustor, such as by exciting acoustic resonance in the fuel line feeding the combustor, or by periodic interruption of the fuel flow through a rotary valve. Tuning is also effectuated by modulating the exhaust gases expelled from the processing chamber such as by use of a valve placed in the exhaust flow. A temperature-resistant variable frequency acoustic driver may also be employed to excite the nonlongitudinal oscillations, as well as modulation of the air intake to the combustor and modulation of hot gases expelled from the combustor prior to entry into the processing chamber.

Still more particularly described, a plurality of frequency-tunable pulse combustors are employed to excite the nonlongitudinal oscillations in the processing chamber. These pulse combustors are mounted in particular geometric arrays to excite transverse plane or three dimensional oscillations. The preferred frequency-tunable pulse combustor comprises a combustor tube which includes a combustion zone wherein a reaction of fuel and air occurs and heat is released to excite a standing acoustic wave in the combustor. An air intake supplies combustion air into the combustion zone for reaction, and a fuel injector supplies fuel into the combustion zone. Hot gases are exhausted from the combustor tube by exhaust means. The frequency of pulsating combustion is controlled by altering the acoustic characteristics of the combustor so as to provide a selectively variable or tunable frequency of pulsating combustion.

Various means are disclosed for altering the acoustic characteristics of the combustor tube. In one disclosed embodiment, the combustor tube comprises an axially translatable interfitting sleeve which is moved to alter the length of the combustor tube. In another embodiment, the back wall of the combustor translates axially, thereby also affecting the length of the combustor tube. In another embodiment, the fuel injector is axially translatable, and is adjusted to position the combustion zone to excite pulsations with a desired frequency in the combustor. Advantageously, use of the tunable pulse combustors to excite natural acoustic resonance in the processing system ensures highly fuel-efficient operation, since pulse combustors are known to be highly efficient.

Other embodiments of the tunable pulse combustor include fuel or air flow modulation for providing fuel or air to the combustion zone at a selectively variable frequency and the provision of primary and secondary fuel or air supplies to the combustion zone, one modulated and one unmodulated.

Yet still more particularly described, the nonlongitudinal acoustic modes excited in the present invention include the transverse plane and three dimensional acoustic modes of the processing chamber. Transverse modes include the radial modes, wherein oscillations occur about a geometric center and along radii of a cylindrical processing chamber, as well as tangential modes, wherein oscillations occur in a "sloshing" or circumferential manner along specific paths in the transverse plane of a cylindrical processing chamber, and tangential-radial modes wherein oscillations occur along both radial and the specific paths of the tangential mode in the transverse plane of a cylindrical processing chamber. Advantageously, arrangements of the acoustic exciting means in a particular predetermined array can excite any desired nonlongitudinal mode, or a plurality of nonlongitudinal modes simultaneously, such as simultaneous excitation of a tangential and a radial mode. Material subjected to the nonlongitudinal oscillations experiences a high degree of acoustic excitation which promotes particle and gaseous dispersion as well as heat, mass and momentum transfer to and from the material.

Accordingly, it is an object of the present invention to provide a novel pulsating processing apparatus and method which utilizes the excitation of acoustic waves to improve heat, momentum and mass transfer processes, and increase process output and thermal efficiency.

It is another object of the present invention to reduce operating costs in a material processing system by enhancing the rates of heat, momentum and mass transfer.

It is another object of the present invention to provide an improved pulsating processing system which employs nonlongitudinal acoustic oscillations in a chemical, thermal, or physical material processing system to enhance the process.

It is another object of the present invention to provide an improved pulsating processing system which includes means for selectively exciting nonlongitudinal acoustic modes in a processing system to take advantage of the natural acoustic modes of a processing chamber.

It is another object of the present invention to provide an improved slurry material dryer which utilizes transverse or three dimensional acoustic oscillations in a drying chamber to promote and enhance drying.

It is a particular object of the present invention to provide an improved drying apparatus for color sensitive material such as kaolin.

It is another object of the present invention to provide an improved pulse combustor with improved operational range.

It is another object of the present invention to provide an improved pulse combustor which is frequency tunable so that it may be successfully employed to excite various acoustic modes in furnaces or other processing chambers with which such combustors may be used.

It is another object of the present invention to provide an improved pulse combustor which is frequency tunable.

It is another object of the present invention to provide an improved pulse combustor which possesses independent means to control the air and fuel flow rates, and locations of air and fuel injection into the combustor, to enable optimization of the characteristics of the combustor, such as operation over wide ranges of fuel/air ratios and fuel inputs to control the energy content, composition, temperature, amplitude and frequency of pulsations of the combustor exhaust flow.

It is another object of the present invention to provide an improved industrial material processing system such as an industrial dryer which does not require injection of material to be dried into the exhaust flow of a pulse combustor, thereby undesirably affecting the operation of the pulse combustor.

It is another object of the present invention to provide an improved pulsating processing system such as an industrial dryer wherein the drying rate of the material in the dryer can be controlled by changing the depth of the processing chamber without the need for retuning the system.

It is another object of the present invention to provide an improved industrial material processing system such as an industrial dryer which takes advantage of the natural nonlongitudinal acoustic resonance of the dryer without requiring the use of a pulse combustor.

It is another object of the present invention to provide an improved industrial material processing system such as an industrial dryer wherein the drying rate can be controlled by controlling the path length of material through the system with transverse oscillatory movement of the material.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3 is a schematic side view, in cross section, of another embodiment of a material processing system constructed in accordance with the present invention, wherein the processing chamber is operated at an angular inclination.

FIG. 4 is a schematic end view, in cross section, of the embodiment of FIG. 3, illustrating the tumbling path or trajectories of material in the system.

FIG. 9 is another schematic end view, in cross section, of a cylindrical processing chamber illustrating placement of combustors or other acoustic exciting means to excite tangential acoustic modes.

FIG. 10, consisting of FIGS. 10A and 10B, are schematic end and side views, in cross section, of a cylindrical processing chamber illustrating placement of combustors or other acoustic exciting means to excite radial acoustic modes.

FIG. 11 are schematic end and side views, partly in cross section, of a cylindrical processing chamber illustrating placement of combustors or other acoustic exciting means to excite longitudinal oscillations.

FIG. 12 is a schematic side view, in cross section, of yet another embodiment of the material processing system of FIG. 1, employing acoustic drivers to excite transverse acoustic oscillations.

FIG. 13 is a schematic side view, in cross section, of yet still another embodiment of a material processing system constructed in accordance with the present invention, wherein nonlongitudinal acoustic oscillations are excited by rotary valves placed in the hot gas inflow to the processing chamber and/or in the exhaust flow from the processing chamber.

FIG. 14 is a schematic side view, in cross section, in detail, of a rotary valve employed in the embodiment of FIG. 13.

FIG. 15 is a schematic side view, in cross section, of yet another embodiment of a material processing system constructed in accordance with the present invention, wherein a fuel flow modulator is employed to excite the nonlongitudinal acoustic resonance in the processing chamber.

FIG. 16 is a detailed side view, partly broken away, of the rotating-sleeve fuel flow modulator employed in the embodiment of FIG. 15.

FIG. 17 is a schematic side view, in cross section, of the preferred embodiment of a tunable pulse combustor constructed in accordance with the present invention.

FIG. 21 is a schematic view, in cross section, of another embodiment of the present invention involving use of transverse acoustic modes in the magnetohydrodynamic generation of electricity.

DETAILED DESCRIPTION OF THE PREFERRED EMBODIMENTS

Figure 1:
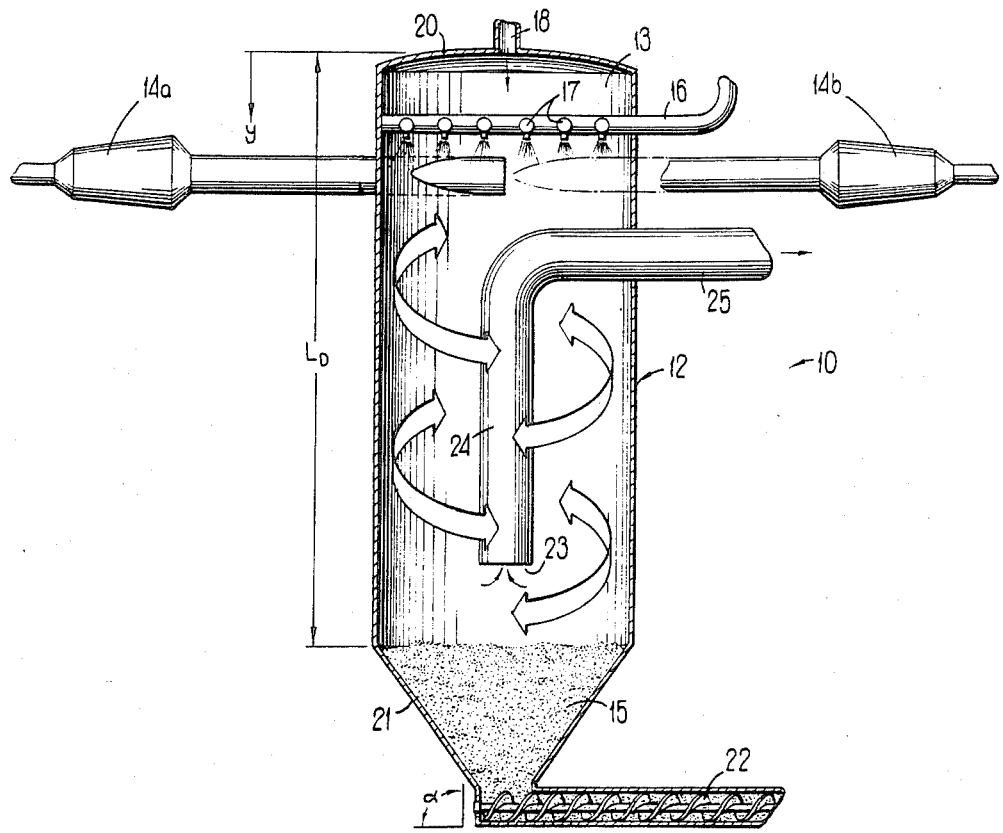
FIG. 1 is a schematic side view, in cross section, of a material processing system according to a preferred embodiment of the present invention, wherein a pair of pulse combustors are employed to excite a tangential acoustic mode in a processing chamber.

Referring now to the drawings, in which like numerals indicate like elements throughout the several views, and more particularly to FIG. 1 thereof, a preferred embodiment of a material processing system 10 constructed in accordance with the present invention is illustrated. The system 10 includes a generally cylindrical processing chamber 12 and a pair of pulse combustors 14a, 14b connected at the upper end 13 to excite transverse oscillations in the processing chamber (see FIG. 2). In particular, the illustrated system 10 is a dryer apparatus adapted for drying a slurry of wet material, such as kaolin, introduced through a supply pipe 16 which is preferably aligned with an acoustic pressure nodal line and injected downwardly into the upper end 13 of the processing chamber 12 through a plurality of nozzles or valves 17. If required, dilution air may be introduced through a dilution air inlet 18 to reduce the temperature in the processing chamber to a desired level.

The processing chamber 12 also includes a closed top 20 and a frustoconical collection zone 21 wherein dried material 15 is deposited after experiencing acoustic pulsations throughout its residence time in the dryer. An auger-type removal system 22 is employed to remove the dried material 15 from the collection zone 21.

Generally, the exhaust means for the processing chamber should be positioned near pressure nodes of induced oscillation to minimize interference with the oscillations. Exhaust gases from the system 10 of the preferred embodiment therefore exit via a radially-extending exhaust port 25. The exhaust gases in the preferred embodiment are drawn into a port 23 by a negative pressure created by an exhaust fan (not illustrated), and thence into a longitudinally extending and axially positioned exhaust pipe 24. Exhaust gases drawn into the exhaust pipe 24 are vented from the processing chamber through the exhaust port 25 which directs the exhaust gases out of the system. The exhaust pipe 24 is therefore preferably positioned along an axis of the cylinder of the processing chamber 12 since the axis is closest to pressure nodes of tangential modes of oscillation, therefore only minimally interfering with the oscillations of these modes in the processing chamber.

As material is introduced into the top of the processing chamber 12, and falls downwardly through the processing chamber under the influence of gravity, the material experiences tangential acoustic pulsations in each horizontal plane in the dryer in the embodiment of FIG. 1. Advantageously, the material to be dried is not injected directly into the exhaust stream emanating from the pulse combustors 14a, 14b, and therefore do not interfere with the pulse combustor operation. The drying time of the material can be controlled by varying the dryer length L and inclination angle α of the dryer.

The pulse combustors 14a, 14b in FIG. 1 are mounted to the processing chamber 12 so as to excite transverse acoustic oscillations in the processing chamber. As can best be seen in FIG. 2, the pulse combustors are operated as a tandem pair and are mounted to exhaust gases from exhaust region 30a, 30b of the combustors and along an interior circumference of the processing chamber 12.

FIG. 3 illustrates a second preferred embodiment 10' wherein the processing chamber 12' is placed at an angle α. In this embodiment, the pulse combustors 14a', 14b' are operated to impart a spiral, tumbling motion to material introduced into the system through injection valves 17', as shown in FIG. 4, which are positioned diametrically opposite the exhaust outlets 30' of the combustors 14'. The exhaust entry port 23' is positioned along an axis of processing chamber, aligned with the pressure nodes of the tangential acoustic modes.

The combined effects of gravity and pulsating tangential velocity oscillations in the angularly inclined processing chamber 12' will produce a "tumbling" spiral flow in the processing chamber. As shown in FIG. 4, the processed particles will be periodically urged along tangential paths inside the processing chamber by the oscillating gaseous flow from the combustors. This tangential movement will be followed by downward movement due to the influence of gravity. The resultant paths of travel are as shown in FIGS. 3 and 4, a generally inwardly falling spiral. The result is that the length of the path of travel of particles in the processing chamber is increased, thereby increasing the exposure time of the particles to the heat of the gases from the combustor.

TRANSVERSE ACOUSTIC MODES

Inasmuch as the preferred embodiments of the present invention utilize transverse acoustic modes in the processing chamber to enhance the various processes occurring therein, it is appropriate to next describe the methods by which such transverse acoustic excitations may be excited. It will be noted that the processing chambers 12 in the preferred embodiments are generally cylindrical; however, it should be understood that other processing chamber geometrical configurations are also operable. Taking the case of the generally cylindrical processing chamber, those skilled in the art will recognize that in solving wave equations for guides of a circular cross-section, Bessel and classical harmonic oscillator differential equations result. Accordingly, the solution for the pressure P' of a standing three dimensional acoustic mode within the cylinder may be stated as:

$$P' = [A \cos l\pi y/L][\cos m\theta J_m(S_{m,n} r/R)] \quad \text{(EQUATION 1)}$$

where $l = 0, 1, 2, \ldots$ (purely transverse modes occur for $l = 0$);

$A$ = the amplitude of the acoustic pressure oscillations;

$y$ = the axial coordinate of the cylinder;

$L$ = the length of a given cylinder;

$\theta$ = the transverse angular coordinate of the cylinder;

$R$ = the radius of the given cylinder;

$r$ = the radial coordinate of the cylinder;

where $m = 0, 1, 2, \ldots$ (purely radial transverse modes occur for $m = 0$);

where $n = 0, 1, 2, \ldots$ (purely tangential transverse modes occur for $n = 0$); and $S_{m,n}$ = the eigenvalues representing the solutions of the Bessel function $J_m'(x) = 0$.

Figure 2A:
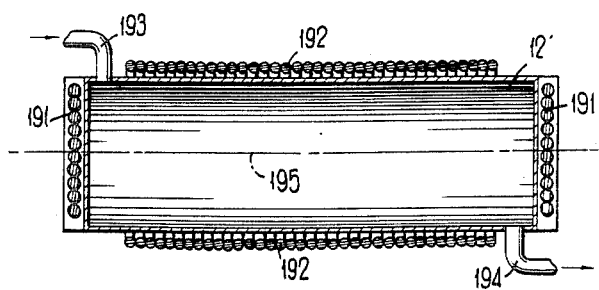
FIG. 2, consisting of FIG. 2A and FIG. 2B, are schematic end views, in cross section, of the preferred embodiment of FIG. 1, showing pressure and flow stream lines in the processing chamber when its first tangential mode is excited.
Figure 2A:
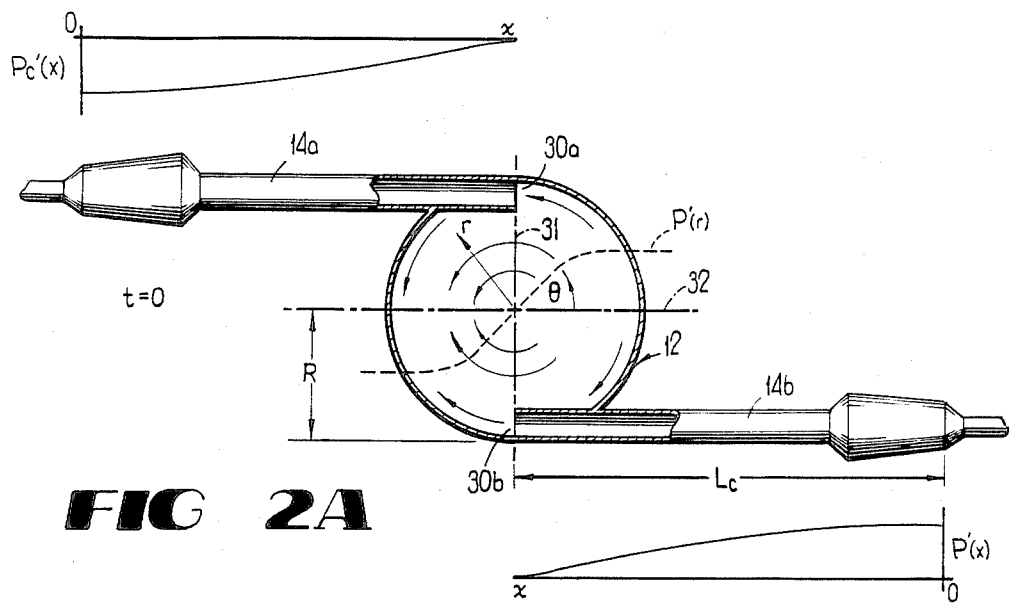

FIGS. 1 and 2 illustrate the above coordinates and parameters. Those skilled in the art will also recognize that the acoustic resonance inside a generally cylindrical processing chamber depends upon the geometry of the cylinder, and the properties and the temperature of the medium inside the cylinder. The transverse mode frequency must satisfy the following equation:

$$S_{m,n} = \frac{\omega R}{C} = \frac{\omega R}{\sqrt{\sigma RT}} = \frac{2\pi R}{\lambda} \quad \text{(EQUATION 2)}$$

where
$\lambda$ = wavelength;
$\omega$ = frequency;
$R$ = radius of the cylinder;

T = temperature of the medium;
C = $\sqrt{\sigma RT}$ = velocity of sound in the cylinder; and
$\sigma$ = ratio of specific heats.

As will be described in greater detail below, one result of Equation 2 is that the wavelength of the acoustic oscillations in a high temperature region such as inside the combustor 14 will no longer than inside the processing chamber, since the temperature inside the processing chamber is lower than inside a fuel-burning combustor. For example, if $L_c$ represents the length of the combustor 14, generally $L_c > R$ in order to maintain the same frequency of oscillation inside the pulse combustor and the processing chamber. It will therefore be understood by those skilled in the art that varying $L_c$ has the effect of varying the frequency of excitation inside the processing chamber.

Another important observation is that while orientation of acoustic exciting means influences the characteristics of the excited oscillations, frequency of excitation is the predominant factor. For example, it should be apparent that tangential pulses of heated gases from pulse combustors are more likely to excite tangential modes than radial modes. However, because the internal acoustic characteristics of the processing chamber, and not external influences, are determinative of the frequencies of the natural acoustic modes, provision of sufficient pulsating energy at the natural resonance frequencies of desired modes of operation will excite the modes regardless of orientation of the exciting means.

As a practical matter, the transverse acoustic modes of resonance will be detected in the following manner. A microphone or other acoustic pick-up transducer or detector should be attached to the exterior of the processing chamber, or on the interior if the temperature inside the chamber will not adversely affect the transducer. The chamber should then be excited with suitable exciting means, as described herein. The amplitude of acoustic excitation as detected by the transducer should then be displayed as a function of frequency. As the frequency is varied over a range, maxima and minima of the amplitude will be observed; the maxima will indicate the frequencies of the natural modes of acoustic resonance. Transverse and three dimensional resonance may be confirmed through a comparison of the expected resonance frequencies, found through a theoretical analysis according to Equations 1 and 2.

It will of course be understood that operation at a particular transverse resonance mode will not necessarily be the end of the inquiry when preparing a particular process for use in accordance with the present invention. Those skilled in the art will understand that optimization of some parameter of the process is the ultimate consideration. For example, in the particular case of kaolin drying, the moisture content of the end product is the parameter of interest. Other processes will have other parameters of interest, for example, a chemical process may have the concentration of a particular constituent compared to other constituents as the primary parameter of interest. Likewise, the temperature of the end product being subjected to a process may be another parameter of interest. Accordingly, to optimize a given process to take maximum advantage of the acoustic excitations being induced in the processing chamber, it will be necessary to monitor the parameter of interest as a function of the frequency and amplitude of the oscillations.

As a particular example, it may be observed that the moisture content of a product such as kaolin reaches a desired level when the processing chamber is operated at a frequency of excitation which does not exactly match one of the natural resonance modes. In accordance with the invention, then, the process should be operated at the optimization frequency for desired moisture content and not a particular resonance mode. The transverse or three dimensional acoustic excitations will still affect and enhance the process, notwithstanding that the desired end result or parameter is optimized at a frequency different from one of the natural acoustic resonance modes of the processing chamber.

Figure 2B:
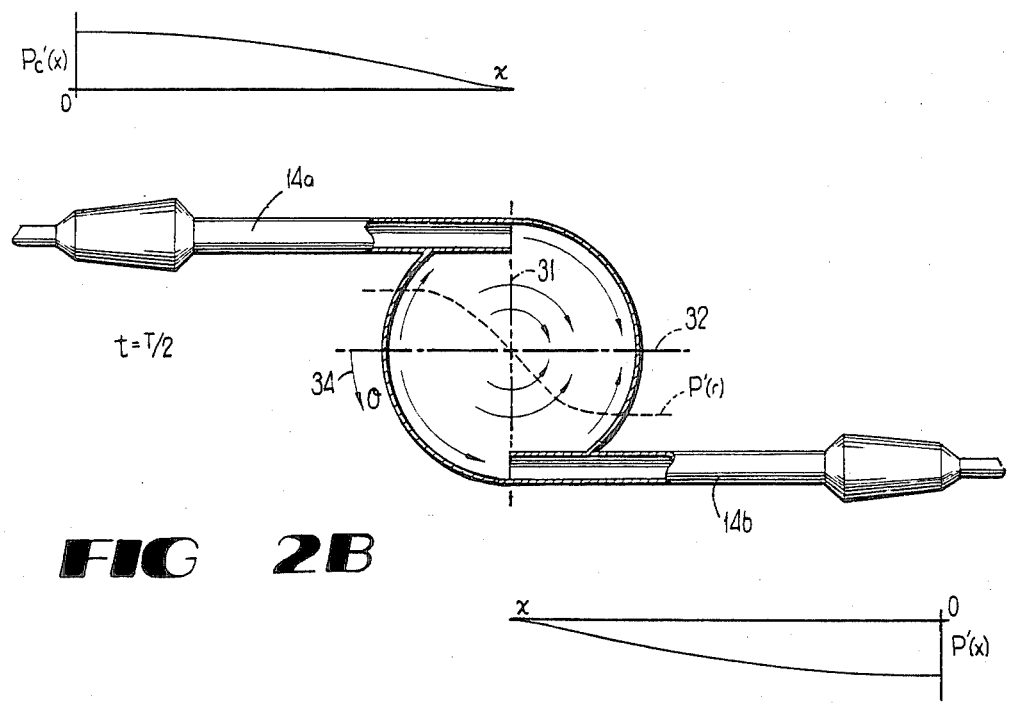

FIG. 2 provides instantaneous views of the pressure and flow stream lines at the beginning of a period of oscillation (time t = 0) in FIG. 2A and at the middle of the period (t = T/2) in FIG. 2B, for the first tangential mode (n = 0 in Equation 1). The pulse combustors 14a, 14b in FIG. 2 operate at the same frequency but in a phased relationship, and have acoustic pressure distributions P'(x) similar to the acoustic pressure P'(r) occurring inside the processing chamber 12. The exhaust outlets 30a, 30b of the pulse combustors align with a pressure nodal line 31, and the pulse combustors are mounted to exhaust heated gases along paths which at least initially are parallel to the velocity nodal line 32.

As illustrated by the P'(r) curves in FIG. 2, which represent the instantaneous pressure, the instantaneous pressure shifts from positive in FIG. 2A at time t = 0, to negative in FIG. 2B at time t = T/2, every half cycle. It will therefore be appreciated that a "sloshing" circumferential or circular motion is imparted to the molecules of hot gases in the processing chamber 12, as the processing chamber is alternately supplied by pulses of hot gases by each combustor 14a, 14b. It will, of course, be understood that synchronized out-of-phase operation is required to excite this tangential mode in the configuration of FIG. 2, in that in-phase operation would result in the creation of a continuous clockwise swirl in the processing chamber.

It should be further understood that the pulse combustors shown in FIG. 2 are tuned to a predetermined frequency to excite the first tangential mode, where $S_{1,0} = 1.84129$. As will be known to those skilled in the art, the frequency of operation of many conventional pulse combustors is a function of the length of the pulse combustor. Accordingly, for fixed frequency pulse combustors, the overall length of the pulse combustors should preferably be selected to be of the order of the radius of the dryer in order to successfully excite the first tangential mode oscillations. In preferred embodiments, however, the pulse combustors or other acoustic exciter should preferably be frequency tunable.

The tangential mode in FIG. 2 is considered a "standing" transverse acoustic mode, because the nodal line 32 is stationary and does not move. It should, however, be understood that spinning transverse modes, where the nodal line 32 possesses an angular velocity, may also be excited. For example, and as shown in FIG. 2B, imparting an angular velocity to the nodal line results in motion in the direction of arrow 34. Those skilled in the art will appreciate that angular movement of the nodal lines may be induced by synchronized operation of the pulse combustors 14a, 14b at the same frequency with a predetermined phase difference which is not equal to 180 degrees. Also, under certain conditions, a combination of a "standing" and spinning transverse acoustic modes may be excited in the processing chamber by various arrangements of the pulse combustors 14a, 14b.

Figure 5:
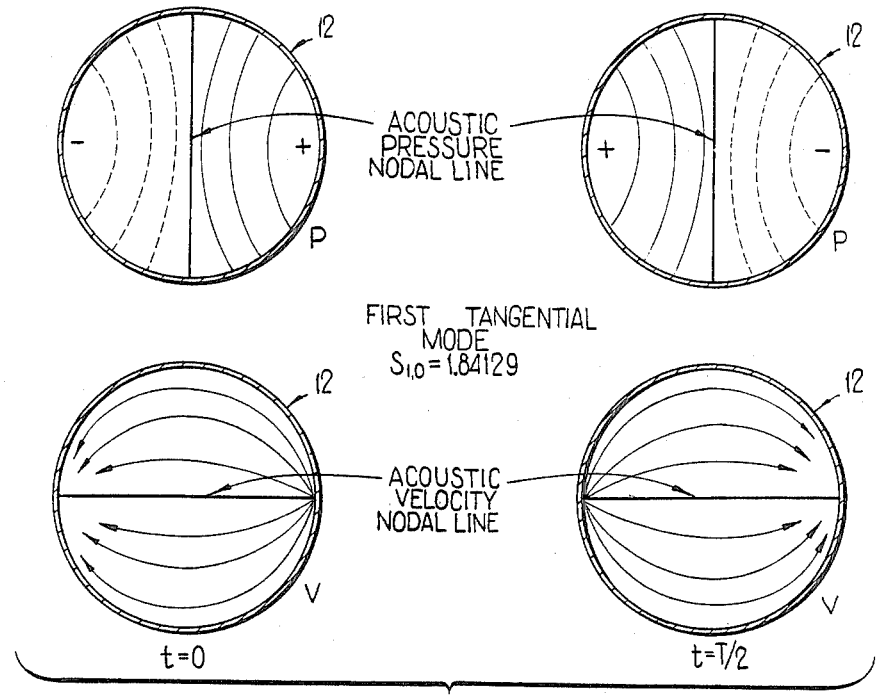
FIG. 5 illustrates the instantaneous pressure and flow stream lines oscillations of the first tangential mode of a cylinder at the beginning and midway of a period of oscillation.

FIG. 5 illustrates the instantaneous pressure and flow stream lines oscillations for the first tangential mode of the processing chamber 12 at the beginning of the period at time t=0, and midway through the period at time t=T/2. It may be observed from this figure that the "sloshing" type stream line oscillations characterize the first tangential mode, while the acoustic pressure gradation lines intersect the velocity nodal lines orthogonally.

It should be understood that the sloshing type behavior of the first tangential mode velocity field will exist in every transverse plane of the processing chamber, inasmuch as longitudinal modes are not deliberately excited, and l=0 in Equation 1. In accordance with the present invention, the interaction of the acoustic resonance of the first tangential mode of the cylinder with material to be processed in the processing chamber enhances the process.

Figures 6A, 6B:
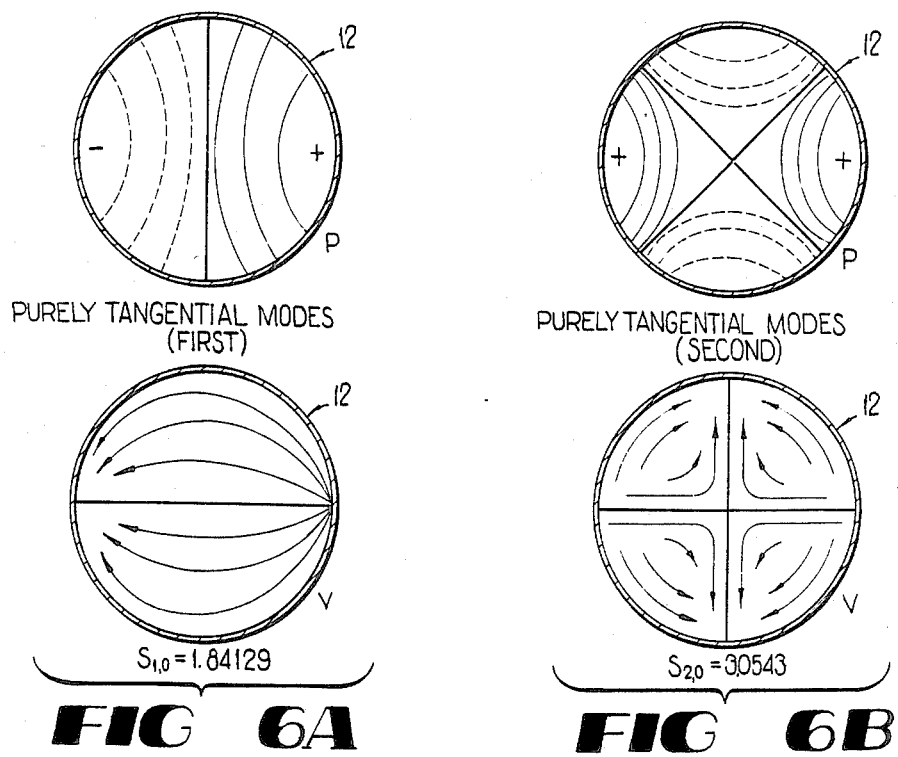
FIG. 6, consisting of FIGS. 6A and 6B, illustrates first and second tangential modes of oscillation.

It should also be understood that natural acoustic modes other than the first tangential mode may be excited by the system hereindisclosed, for example, while FIG. 6A illustrates the first purely tangential mode as in FIG. 5, FIG. 6B illustrates the second tangential mode, where $S_{2,0}=3.0543$ in Equation 1, having pressure and flow stream lines diagrams as illustrated therein. It will also be understood and appreciated that other higher tangential modes may also be excited, although as a practical matter the first and second will usually be the easiest to excite and maintain.

Figure 7A:
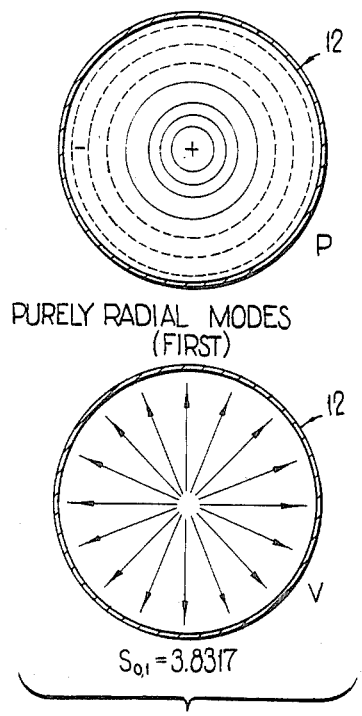
FIG. 7, consisting of FIGS. 7A and 7B, illustrates first and second radial modes of oscillation.
Figure 7B:
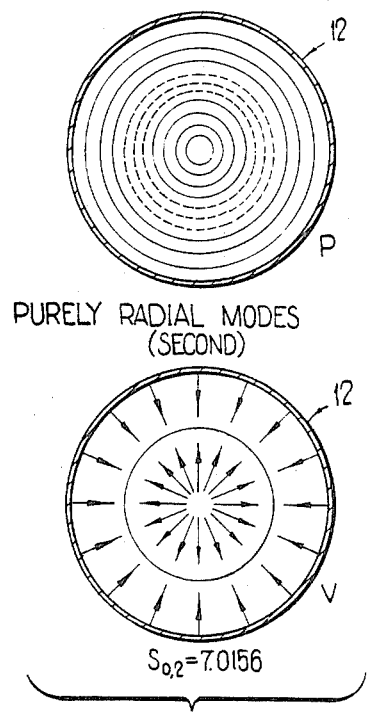

In similar a manner, FIG. 7 illustrates purely radial modes of oscillation, where m=0 in Equation 1. In FIG. 7A, the pressure P and flow stream lines V characteristics of the first radial mode are illustrated, for $S_{0,1}=3.8317$. FIG. 7B illustrates the second radial mode, for $S_{0,2}=7.0156$. Again, other higher order radial modes are also contemplated in the present invention, but the first and second modes are believed to be of the most practical utility.

It should also be understood that other transverse acoustic modes with motions consisting of combinations of radial and tangential oscillations are also contemplated in the present invention. For example, the transverse mode characterized by m=1 and n=1 in Equation 1 is such a combined tangential-radial mode.

Figure 8A:
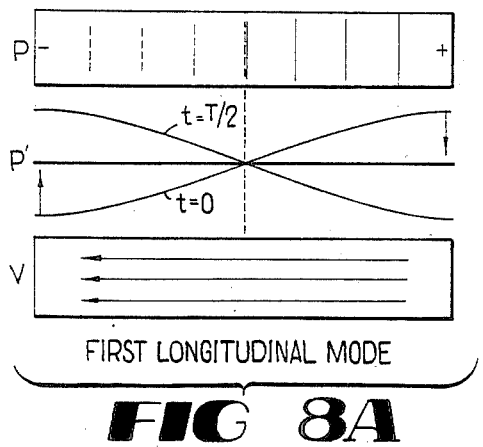
FIG. 8, consisting of FIGS. 8A and 8B, illustrates first and second longitudinal modes of oscillation.
Figure 8B:
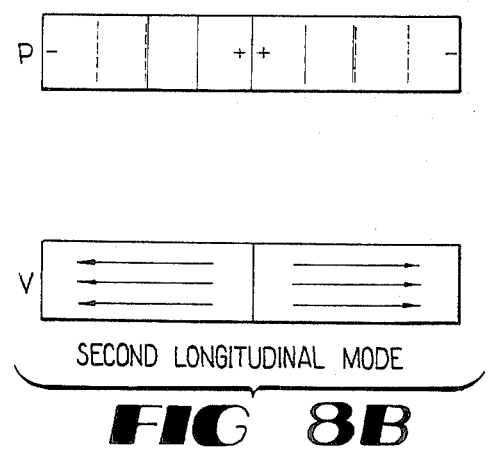

A combination of a particular transverse mode and a particular longitudinal mode may be considered a three-dimensional mode, due to the fact that three-dimensional acoustic modes may be decomposed into their transverse components and longitudinal components. Accordingly, it will be understood that deliberate excitation of particular three-dimensional acoustic resonances in the processing chamber is within the scope of the present invention. For example, FIG. 8A illustrates the pressure P and flow stream lines V of the first longitudinal mode, where l=1 in Equation 1 and FIG. 8B illustrates the second longitudinal mode, where l=2.

It should also be understood that excitation of longitudinal modes simultaneously with transverse modes may inevitably occur when the frequencies of one or more longitudinal and/or transverse modes are smaller than the frequency of the excited transverse or three dimensional mode. For example, assume that for a given processing chamber, it is desired to excite the first tangential mode, and that the frequency required to excite this mode is 600 Hertz (Hz). Assume further that the natural frequencies of the first four longitudinal modes are below 580 Hz. Due to the differences between these frequencies, and the fact that the acoustic properties of any given geometrical configuration for a processing chamber will never achieve the theoretical expected characteristics, under some circumstances excitation of the first tangential mode will simultaneously excite one or more of the four longitudinal modes in this example.

It will therefore be understood that operation with "combined" acoustic modes are within the contemplation of the present invention. Those skilled in the art will understand that "combined" modes may be considered a combination of a tangential and a radial, or a tangential and a longitudinal, or a radial and a longitudinal, or other combination of more than one acoustic mode. Those skilled in the art will understand that each one of these combined modes has its own unique frequency whose magnitude depends upon the frequencies of its constituent modes. Formulae for the frequencies of these combined modes are readily available in the acoustics literature.

METHODS FOR EXCITING TRANSVERSE AND THREE-DIMENSIONAL ACOUSTIC MODES

FIGS. 9–11 illustrate orientation of combustors or other excitation means to excite various acoustic modes in the processing chamber 12. Of course, it will be recalled that the configuration shown in FIG. 2 may be employed to excite tangential modes. In addition, and as shown in FIG. 9, a tandem pair of parallel, aligned combustors 14c, 14d can be tangentially connected to opposite tangents of the processing chamber 12 and operated in phase in order to excite tangential oscillations. Analogous to the case of FIG. 2, out-of-phase operation of the parallel tandem combustors 14c, 14d would result in a spinning motion of the first tangential mode in the processing chamber. It is to be understood that tandem or other placements of one or more pulse combustors may be used to excite the first tangential mode of the processing chamber.

FIG. 10 illustrates placement of combustors 14e, 14f, and 14g to excite one of the radial modes of the processing chamber 12. As shown in FIG. 10, combustors 14e, 14f, 14g are mounted aligned with the radii of the generally cylindrical processing chamber 12 so that the exhaust outlets 30e, 30f, 30g are tangential to the circular acoustic pressure nodal line 35 of the excited radial mode. Additional pulse combustors installed in a manner similar to that of combustors 14e, 14f, 14g may be added if additional energy input and/or larger pulsation amplitudes are required in the processing chamber 12. Finally, other pure radial modes of the processing chamber 12 may be excited by using pulse combustors having the same frequency as that of the mode to be excited and positioning their exhaust exit planes tangential to one or more circular acoustic pressure nodal lines of the mode to be excited.

Referring next to FIG. 11, mounting of a combustor 14h so that the exhaust outlet 30h is positioned at a distance L/2, where the total length of the processing chamber 12 is L, tends to excite the fundamental longitudinal mode of oscillation. This and other longitudinal modes may be simultaneously excited together with one or more transverse modes to obtain three-dimensional modes.

As has been described above, the preferred embodiments employ tunable pulse combustors for exciting desired transverse acoustic modes. However, it should be understood that various means for producing acoustic excitations in the processing chamber 12 may be successfully employed to excite the transverse and other acoustic modes. A tunable pulse combustor suitable for use as excitation means is illustrated in FIG. 17 and described hereinbelow. Other suitable excitation means will be described next.

FIG. 12 illustrates another technique for exciting nonlongitudinal acoustic modes in the processing chamber 12. In the embodiment 10" shown in FIG. 12, material to be dried or otherwise processed is provided through the supply pipe 16 as in the embodiment of FIG. 1. However, steady state or pulse combustors may be employed to provide the hot flow. For example, steady state combustors with exhaust outlets 85 positioned towards the bottom of the processing chamber 12 may provide a stream of hot gases. In order to induce the desired transverse modes, a plurality of frequency tunable acoustic drivers 90 such as electropneumatic drivers or electromagnetic drivers are positioned in a diametrical array around a circumference of the processing chamber 12. These drivers 90 may be positioned as described hereinabove for the pulse combustors to excite any desired transverse and/or three dimensional acoustic modes.

FIG. 13 illustrates yet another embodiment of the material processing system 10''' wherein nonlongitudinal acoustic modes are excited by yet other means. In FIG. 13, two different methods are illustrated, although they may be used simultaneously if desired. First, the material to be processed is introduced through a supply pipe 16 as in the embodiment of FIG. 1. Hot gases from a decoupled pulse combustor or other steady state combustors are introduced through a gas inlet 101 positioned towards the lower end of the processing chamber 12. It will of course be understood that the orientation of the gas inlet 101 with respect to the processing chamber 12 may be as shown in FIG. 2 or 9 to excite tangential oscillation, FIG. 10 to excite radial oscillation, or FIG. 11 to excite longitudinal oscillation.

Still referring to FIG. 13, a rotary plate or "butterfly" valve 103 is provided for inducing oscillations in the stream of hot gases entering the processing chamber 12. The rotary plate valve 103 comprises a generally circular disk through which extends a shaft 104 which is received in bushings 105, 106 mounted in the gas inlet pipe 101. A motor $M_2$ rotates the shaft 104 at a predetermined speed, thereby periodically varying the cross sectional area open for the flow of gases. It will therefore be appreciated that the velocity of the stream of hot gases is modulated to a selectively variable frequency, inducing acoustic oscillations in the processing chamber 12.

Also illustrated in FIG. 13 is the employment of a rotary plate valve 103' positioned in an exhaust outlet pipe 110 for modulating the exhaust flow. It will be understood that the orientation of the exhaust outlet pipe 110 with respect to the processing chamber is as described above in connection with the gas inlet pipe 101, to excite tangential or radial oscillations as may be desired. The amplitude of the pulsations may be controlled by changing the diameter of the bufferfly valve 103. For example, by providing a smaller diameter butterfly valve, less restriction is placed on the flow of the gases, thereby decreasing the amplitude of oscillations excited in the processing chamber.

It is also within the contemplation of the present invention that the processing chamber 12 can operate as a combination material processing chamber and a combustor. Still referring to FIG. 13, assume that the gas inlet pipe 101 is a fuel inlet pipe instead of a preheated gas inlet, that valve 103 is employed to modulate the fuel flow to the processing chamber, that air enters the processing chamber at the vicinity of the fuel inlet point, and that combustion of the fuel and air occurs directly in the processing chamber.

The valve 103 in this situation will modulate the flow of fuel into the combustor/processing chamber. By changing the speed of rotation of the motor M2 the frequency of the fuel inflow oscillations and combustion oscillations can be varied and chosen to optimize a certain process parameter as discussed above. The process will result in the excitation of acoustic oscillations in the system which will consist of axial oscillations in the fuel inlet line 101 and transverse or three dimensional oscillations inside the processing/combustor chamber 12.

Turning now to FIG. 15, yet another method for exciting nonlongitudinal acoustic oscillations in the processing chamber 12 is illustrated, with a combustor 120 which operates by a different fuel flow modulation method. Air is introduced through an air inlet 121 into a combustor 120; exhaust gases are expelled through an exhaust pipe 122 into the processing chamber 12, oriented in a manner as described above, to excite desired nonlongitudinal oscillations. Fuel is provided through a fuel line 124 into a fuel flow modulator 125, which modulates the flow of fuel through a fuel pipe 126 into the combustor 120 to provide for pulsating combustion.

FIG. 16 illustrates a preferred embodiment of the fuel flow modulator 125 employed in the system of FIG. 15. The fuel flow modulator 125 comprises a fixed fuel inlet pipe or sleeve 135 connected to receive a flow of fuel from fuel line 124, and a concentric rotating sleeve 130 positioned on the exterior of the inlet pipe 135. The fixed sleeve 135 includes a plurality of orifices 131 positioned diametrically around a circumference of the pipe. The rotating sleeve 130 also includes a similar plurality of orifices 136 which are radially alignable opposing the orifices 131 in the fixed sleeve.

The rotating sleeve 130 is affixed to an idler gear 140, which is driven by a drive gear 141. A shaft 142 connected to a motor $M_4$ is provided through a bushing 143 in the side wall of the fuel flow modulator 125. It will be appreciated that the speed of rotation of motor $M_4$ controls the speed of rotation of the rotating sleeve 130, thereby controlling the frequency of modulation of fuel flow. It will also be appreciated that the rotation of the rotating sleeve 130 periodically interrupts the flow of fuel introduced through the fuel inlet pipe 124, so that the fuel flow exiting the modulator 125 via the fuel pipe 126 is modulated as a function of the speed of rotation of the rotating sleeve 130.

IMPROVED PULSE COMBUSTOR

FIG. 17 illustrates the preferred embodiment of a tunable pulse combustor 14 which can be used to excite both longitudinal and nonlongitudinal acoustic modes of operation in the present invention. In the preferred embodiment of FIG. 17, the pulse combustor 14 comprises a combustion chamber 141 which is generally frustoconical in shape, with the larger end disposed towards the exhaust outlet 30 of the combustor. A primary source of air 142 is provided through a pipe of the like through an L-shaped elbow 143 and an inlet sleeve 145 so that the air is directed to enter the combustion chamber 141 along an axis of the combustor.

A secondary or tangential air source 144 is provided directly into the combustion chamber 141, intersecting along a tangent of the frustoconically-shaped combustion chamber. Preferably, both the primary air source 142 and the secondary, tangential air source 144 are provided from a pressurized source such as a fan, blower, or the like.

Fuel is provided to the pulse combustor through a nozzle 146 which is attached to the end of an axially translatable fuel injector pipe 147. The fuel injector pipe 147 enters the inlet sleeve 145 through a seal or bushing 148 which allows axial translation of the fuel nozzle 146 and fuel injector pipe 147. Advantageously, therefore, the location of fuel injection can be varied to optimize combustion processes.

The exhaust of the combustor 14 comprises a fixed sleeve 150 and an axially translatable outer tail pipe sleeve 152 aligned axially with the fixed sleeve 150. Preferably, the outer tail pipe sleeve 152 is of a larger diameter than the interior or fixed sleeve 150, so as to allow entrance of cooling and dilution air through concentric openings 154. However, the diameters of the outer tail pipe sleeve 152 can be reduced to a relatively close tolerance to allow for axial translation under heated conditions if the openings 154 are not desired.

Axial movement of the outer tail pipe sleeve 152 with respect to the fixed sleeve 150 varies the length $L_c$, and thereby the overall length of the combustor. Those skilled in the art will understand that varying the length $L_c$ allows for changing the wavelength of pulsations in the combustor, thereby allowing tuning.

An ignition device 148 such as a spark plug or the like is positioned along the inlet sleeve 145 adjacent the opening into the combustion chamber 141 so as to provide initial ignition for the combustor. Those skilled in the art will understand that pulsating combustion is self-sustaining after initial ignition, thereby obviating cyclical ignition.

In addition, the secondary tangential air source 144 provides more air for combustion, as well as produces swirl and a precessing core flow in the combustion zone 141, thereby providing a method for controlling the amplitude of pulsations in the combustor. The swirling effect created by the tangential air flow promotes a stable pulsating combustion operation over a wide range of air-to-fuel ratios.

Figure 18:
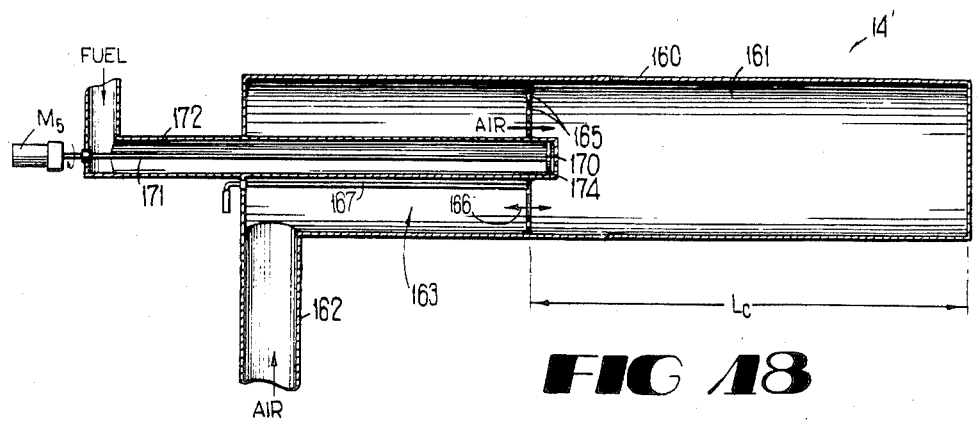
FIG. 18 is a schematic side view, in cross section, of a frequency tunable combustor for exciting resonance in the processing chamber, having a steady air input and a periodic fuel input.

As has been discussed above, the tunable pulse combustor of FIG. 17 is particularly suitable for exciting various nonlongitudinal acoustic modes in the processing chamber of the system shown in FIG. 1. However, it is within the contemplation of the present invention that other combustor tuning means can be employed to provide a frequency tunable combustor. Turning now to FIG. 18, next will be described a tunable pulse combustor which employs fuel modulation in order to induce pulsating combustion in a combustor 14'. As shown therein, the tunable pulse combustor 14' employing fuel modulation comprises a generally tubular combustion tube 160 having a length $L_c$. Exhaust gases exit the combustor through an exhaust port 161, while pressurized combustion air is provided through an air inlet 162 into an air plenum 163. Air passes through a back wall grid or screen 165 which marks the beginning of the combustor tube length $L_c$. The back wall 165 acts as an acoustically closed end for the pulse combustor, although it passes combustion air.

In the preferred embodiment, the back wall grid 165 is axially translatable in the direction of arrow 166 by a sliding control rod 167 or other mechanism such as a gear drive. It will be appreciated that movement of the control rod 167 alters the length $L_c$ of the combustion tube 160, thereby allowing tuning.

Fuel is introduced into the combustor tube 160 through a rotary valve device 170 in a modulated manner. A shaft 171 extends along the length of a fuel inlet pipe 172, which is generally cylindrical and extends axially through the air plenum 163. A motor $M_5$ rotates the shaft 171, as more particularly illustrated in FIG. 19.

Figure 19:
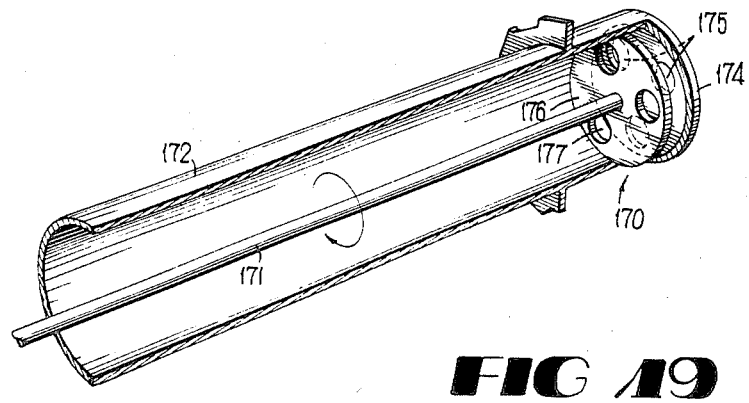
FIG. 19 is a perspective view, partly broken away, of a rotary valve employed in the apparatus of FIG. 18.

In FIG. 19, it may be seen that the rotary valve 170 comprises a circular fixed end plate 174 which includes a plurality of orifices 175 arranged diametrically on the end plate 174. A rotating plate 176 attached to the end of the shaft 171 also include orifices 177 which match the orifices in the fixed plate 174. It will be appreciated that rotation of the rotating plate 176 interrupts the flow of fuel leaving the orifices in the fixed end plate, thereby modulating the fuel flow being provided for combustion in the combustor 14'.

Figure 20:
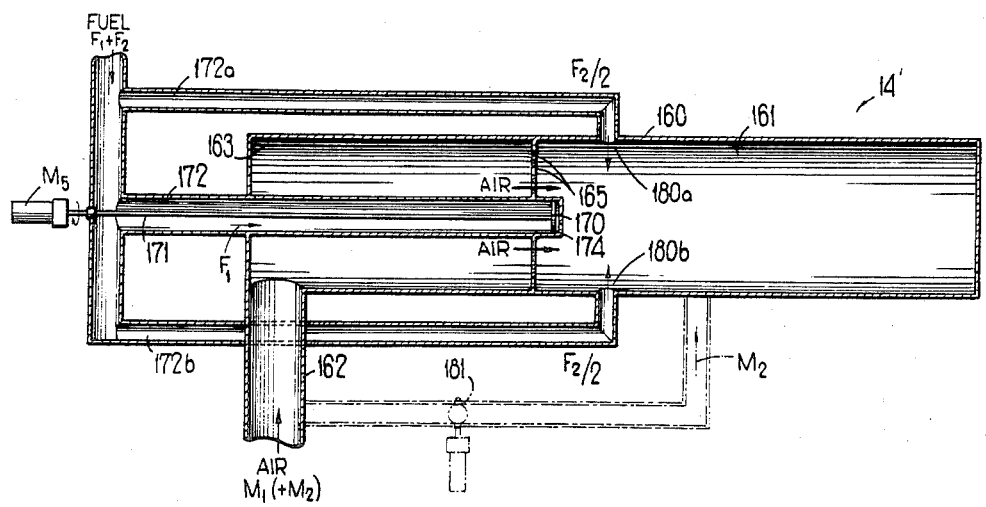
FIG. 20 is a schematic side view, in cross section, of a modified frequency tunable combustor for exciting resonances in the processing chamber, having steady fuel and air inputs and periodic fuel and air inputs.

FIG. 20 illustrates a modification to the combustor illustrated in FIG. 18, wherein there is provided a first or primary fuel flow $F_1$ through the fuel inlet 172 in the manner described above, and a pair of diametrically opposing fuel inlets 180a, 180b positioned downstream of the rotary valve 170. In the embodiment of FIG. 20, fuel inlets 172a, 172b provide a steady fuel flow, while the inlet 172 provides a modulated fuel inflow $F_2$. In combination, the fuel $F_1 + F_2$ entering the combustion region creates a steady state combustion as well as a modulated or pulsating combustion. Accordingly, the quiescent or steady-state combustion level can be controlled by controlling the amount of fuel being provided through the steady state fuel inlets 180a, 180b. While generally $F_1 + F_2 = $ a constant, varying the ratio $F_1/F_2$ by changing the magnitudes of $F_1$ and $F_2$ allows control over the amplitude of pulsations. Control of the amplitude of pulsations generally allows control over the process properties and the noise level of the system.

It will also be understood that the modification of FIG. 20 can be adapted to provide for modulated air flow to provide for pulsating combustion. In this embodiment, shown in dotted relief in FIG. 20, the primary air flow is $M_1$. A secondary air flow $M_2$ may be introduced tangentially as in FIG. 17, radially, or in another manner. The total air supply $M_1 + M_2$ may be held constant, but a modulation valve 181 allows controlling the ratio $M_1/M_2$, thereby varying the amplitude of pulsations. This modification is also particularly suitable for the combustor 14 in FIG. 17, where the primary air flow $M_1$ is axial and the secondary air flow $M_2$ is tangential.

Referring now to FIG. 21, the present invention may also be employed in the magnetohydrodynamic (MHD) generation of electricity. Those skilled in the art will understand that MHD electricity generators employ chambers of ionized fluids or plasmas which are moved under various influences in a magnetic field; electric fields from movement of the charged particles are coupled into coils of conductors surrounding the chamber so that electricity can be generated. Prior art MHD generators have employed longitudinal acoustic waves to operate the MHD powder generator, but those systems required bulky combustors with large length-to-diameter ratios and were prone to undesirable shock wave formation. As shown in FIG. 21, use of nonlongitudinal acoustics as in the present invention, and in particular spinning transverse modes, allows the use of shorter combustors and prevents the formation of undesirable shock waves.

The system of FIG. 21 employs a cylindrical plasma chamber 12' for containing the ionized excitation medium. Magnets 191 are positioned at the two ends of the plasma chamber 12' to establish a magnetic field aligned with the axis 195 of the plasma chamber 12'. Electrical conductor coils 192 are wrapped around the cylinder 12' to receive electrical energy generated by movement of the plasma in the magnetic field. Transverse acoustic excitation is provided to the plasma chamber 12' as described above in various other embodiments, for example, via a modulated plasma inlet 193 oriented tangentially as in FIGS. 2 or 9 for the excitation of tangential modes. The plasma outlet 194 may also be modulated such as by use of the butterfly valve shown in FIG. 14. Various others of the herein-disclosed modulation means may also be employed to provide the required frequency modulation. For example, a modulated stream of ionized gases may be provided from a tunable pulse combustor constructed as described herein.

Advantageously, use of one or more of the spinning transverse acoustic excitation means sets up transverse acoustic oscillations in the plasma chamber, causing movement of the plasma in transverse directions normal to the direction of the magnetic field produced by magnets 191, and coupling electromagnetic energy into the coils 192 along the entire length of the plasma chamber. Since the oscillations in the plasma chamber occur in the transverse planes instead of in the longitudinal dimension, smaller MHD generators may be used and dissipative shock waves will not form inside the MHD generator. Maximum benefit may be expected when the nonlongitudinal natural acoustic modes are selectively excited by tuning to the natural frequencies of resonance of the plasma chamber.

It will therefore by now be appreciated that the present invention is not limited merely to physical processes such as drying, although this is a known useful application, and that other chemical, physical, and thermal processes may successfully employ the methods described herein to obtain the advantages of low cost apparatus, efficiency of operation and enhancement of the process. For example, it is believed that calcining, a combination of physical and chemical processes, may benefit from use of the methods and apparatus of the present invention. As another example, it is believed that purely thermal processes such as water heating, space heating, steam raising and the like, can benefit from the selective excitation of transverse acoustic modes of resonance, to improve the heat transfer processes within the chamber.

The preferred embodiments of the present invention have been disclosed by way of example and it will be understood that other modifications may occur to those skilled in the art without departing from the scope and the spirit of the appended claims.

What is claimed is:

1. An improved pulsating processing system for conducting a process in a pulsating environment, comprising:

a processing chamber for processing material;

means for introducing material to be processed into said processing chamber;

means operatively associated with said processing chamber for introducing a flow of heated gases into said processing chamber to process material introduced into said processing chamber;

means for exciting at least one transverse or three dimensional acoustic mode in said processing chamber, said exciting means being operative about the frequency of a transverse or three dimensional acoustic mode of said processing chamber;

tuning means operatively associated with said processing chamber and said exciting means for selecting the frequency of said exciting means about the frequency of said transverse or three dimensional acoustic mode; and means for removing processed material from said processing chamber;

whereby material introduced into said processing chamber is subjected to acoustic pulsations about the frequency of said transverse or three dimensional acoustic mode while the material is being processed in said processing chamber.

2. The pulsating processing system of claim 1, wherein said system is a heat transfer system.

3. The pulsating processing system of claim 2, wherein said heat transfer system is a boiler.

4. The pulsating processing system of claim 2, wherein said heat transfer system is a heater.

5. The pulsating processing system of claim 1, wherein said system is a chemical processing system.

6. The pulsating processing system of claim 5, wherein said chemical processing system is a calcining system.

7. The pulsating processing system of claim 1, wherein said pulsating processing system is a physical processing system.

8. The pulsating processing system of claim 7, wherein said physical processing system is a magnetohydrodynamic electrical generation system.

9. The pulsating processing system of claim 7, wherein said physical processing system is a material drying system.

10. The pulsating processing system of claim 9, wherein said material drying system is a kaolin drying system.

11. The pulsating processing system of claim 1, wherein said transverse acoustic mode in said processing chamber is a radial acoustic mode.

12. The pulsating processing system of claim 1, wherein said transverse acoustic mode is a tangential acoustic mode.

13. The pulsating processing system of claim 12, wherein said tangential acoustic mode is the first tangential acoustic mode.

14. The pulsating processing system of claim 12, wherein said tangential acoustic mode is a tangential acoustic mode other than the first tangential mode.

15. The pulsating processing system of claim 12, wherein said exciting means comprises a plurality of combustors operatively associated with said processing chamber so as to excite the first tangential acoustic mode of said processing chamber.

16. The pulsating processing system of claim 15, wherein said plurality of combustors are tangentially mounted to said processing chamber in a nonparallel array.

17. The pulsating processing system of claim 15, wherein said plurality of combustors comprises a pair of combustors tangentially mounted to said processing chamber in a parallel array.

18. The pulsating processing system of claim 17, wherein said pair of combustors are operated in an opposing phase relationship.

19. The pulsating processing system of claim 17, wherein said pair of combustors are operated in a phased relationship.

20. The pulsating processing system of claim 1, wherein said transverse acoustic mode in said processing system is a tangential-radial mode.

21. The pulsating processing system of claim 1, wherein said tuning means comprises variable frequency fuel modulation means for modulating fuel inflow into a combustion region of said combustor means.

22. The pulsating processing system of claim 1, further comprising exhaust means for expelling spent gases from said processing chamber, and wherein said tuning means comprises variable frequency exhaust modulation means for modulating exhaust gases expelled by said exhaust means.

23. The pulsating processing system of claim 22, wherein said exhaust gas modulating means comprises rotary valve means operatively associated with said exhaust means.

24. The pulsating processing system of claim 7, wherein said tuning means comprises variable frequency acoustic driver means operatively associated with said processing chamber.

25. The pulsating processing system of claim 1, further comprising air intake means for introducing air for combustion into said combustor, and wherein said tuning means comprises variable frequency air intake modulation means for modulating air introduced into said combustor through said air intake means.

26. The pulsating processing system of claim 1, wherein said tuning means comprises variable frequency gas modulation means operatively positioned between said combustor and said processing chamber for modulating the flow of hot gases expelled from said combustor into said processing chamber.

27. The pulsating processing system of claim 1, wherein said tuning means comprises a tunable pulse combustor.

28. The pulsating processing system of claim 1, wherein said exciting means comprises a pulse combustor.

29. The pulsating processing system of claim 1, wherein said processing chamber is supported for operation at a predetermined angular inclination.

30. The pulsating processing system of claim 1, further comprising means for introducing gases into said processing chamber for temperature control within said processing chamber.

31. An improved pulsating processing system, comprising:
an acoustically excited processing chamber for processing material;
means for introducing material to be processed into said processing chamber;
means operatively associated with said processing chamber for introducing a flow of heated gases into said processing chamber to process material introduced into said processing chamber;
means for exciting at least one natural longitudinal acoustic mode in said processing chamber; and
selectively variable tuning means operatively associated with said longitudinal mode exciting means for changing the excited frequency to optimize processing of the material introduced into said processing chamber,
whereby material introducing into said processing chamber is subjected to selectable tunable longitudinal acoustic pulsations while the material is being processed in said processing chamber.

32. The pulsating processing system of claim 31, wherein said heated gas introducing means comprises a combustor means, and wherein said tuning means comprises variable frequency fuel modulation means for modulating fuel inflow into a combustion region of said combustor means.

33. The pulsating processing system of claim 31, further comprising exhaust means for expelling spent gases from said processing chamber, and wherein said tuning means comprises variable frequency exhaust modulation means for modulating exhaust gases expelled by said exhaust means.

34. The pulsating processing system of claim 33, wherein said exhaust modulating means comprises rotary valve means operatively associated with said exhaust means.

35. The pulsating processing system of claim 31, wherein said tuning means comprises variable frequency acoustic driver means operatively associated with said processing chamber.

36. The pulsating processing system of claim 31, wherein said heated gas introducing means comprises a combustor means, and wherein said tuning means comprises variable frequency gas modulation means operatively positioned between said combustor and said processing chamber for modulating the flow of hot gases expelled from said combustor into said processing chamber.

37. The pulsating processing system of claim 31, wherein said heated gas introducing means and said tuning means comprises a pulse combustor.

38. The pulsating processing system of claim 31, wherein said heated gas introducing means comprises a combustor, and further comprising air intake means for introducing air for combustion into said combustor, and wherein said tuning means comprises variable frequency air intake modulation means for modulating air introduced into said combustor through said air intake means.

39. The pulsating processing system of claim 31, further comprising means for introducing gases into said processing chamber for temperature control within said processing chamber.

40. The system of claim 31, wherein the optimized processing comprises controlling the final content of the processed material.

41. The system of claim 31, wherein the optimized processing comprises controlling the amplitude of pulsations inside the processing chamber to the reduce noise level.

42. The system of claim 31, wherein the optimized processing comprises controlling the final temperature of the processed material.

43. A method of processing material by subjecting the material to a pulsating processing environment, comprising the steps of:
(1) providing a processing chamber for processing material;
(2) introducing material to be processed into a first predetermined region of the processing chamber;
(3) providing a flow of heated gases to a second predetermined region of said processing chamber to process material introduced into the processing chamber;

(4) providing an acoustic exciter operative at about the frequency of a transverse or three dimensional acoustic mode in the processing chamber; and (5) tuning the acoustic exciter to a frequency about said transverse or three dimensional acoustic mode of the processing chamber.

whereby material introduced into the processing chamber is subjected to acoustic pulsations about the frequency of a transverse or three dimensional acoustic mode of the processing chamber while the material is being processed in the processing chamber.

44. The method of claim 43, further comprising the step of optimizing the processing of material in said processing chamber by providing acoustic oscillations with the acoustic exciter at a frequency which optimizes a particular parameter for a given process.

45. The method of claim 44, wherein the optimized parameter is the temperature of the processed material.

46. The method of claim 44, wherein the optimized parameter is moisture content in the processed material.

47. The method of claim 44, wherein the optimized parameter is the amplitude of pulsations inside the processing chamber to reduce noise level.

48. The method of claim 43, further comprising the step of adding dilution air into the processing chamber for temperature control in the processing chamber.

49. An improved dryer for drying material in a pulsating environment, comprising:

a generally cylindrical drying chamber;

means mounted inside said drying chamber for introducing material downwardly into said drying chamber;

at least one pulse combustor connected to exhaust a pulsating stream of heated gases at a selected frequency along an interior tangential path inside a predetermined first region of said drying chamber;

said frequency of said pulse combustor being selected to excite at least one transverse or three dimensional acoustic mode in said drying chamber for agitating and drying material passing downwardly through said drying chamber;

tuning means operatively associated with said drying chamber for selectively exciting said transverse or three dimensional acoustic mode:

means for collecting dried material in a second region of said drying chamber beneath said material introducing means after passage of said material through said stream of heated gases; and means for removing dried material from said second region, whereby material introduced into said drying chamber is subjected to acoustic pulsations produced by the excited transverse or three dimensional acoustic mode while being dried by the stream of heated gases.

50. The improved dryer of claim 49, wherein said material to be dried is a slurry of material.

* * * * *

UNITED STATES PATENT AND TRADEMARK OFFICE
CERTIFICATE OF CORRECTION

PATENT NO. : 4,699,588

DATED : October 13, 1987

INVENTOR(S) : Ben T. Zinn and Brady R. Daniel

It is certified that error appears in the above-identified patent and that said Letters Patent is hereby corrected as shown below:

In the drawings, Fig. 17, the lead line for reference numeral 146 indicates the fuel nozzle instead of terminating on the sleeve 145.

Fig. 18 and 20 depict the reference numeral 161 and its lead line pointing into the open end of the tube 160.   (as per attached sheets)

Column 9, line 7, change "no" to --be--.

Signed and Sealed this

Fourth Day of October, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,699,588

DATED : October 13, 1987

INVENTOR(S) : Ben T. Zinn and Brady R. Daniel

It is certified that error appears in the above-identified patent and that said Letters Patent is hereby corrected as shown below:

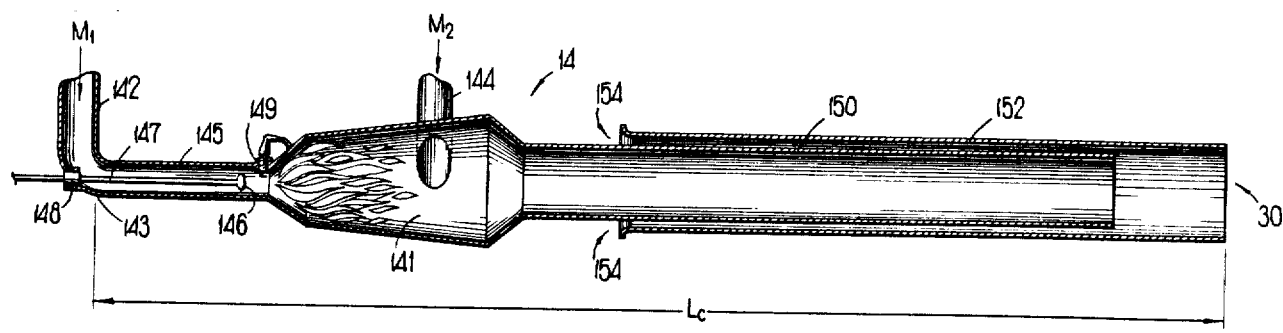

FIG A7

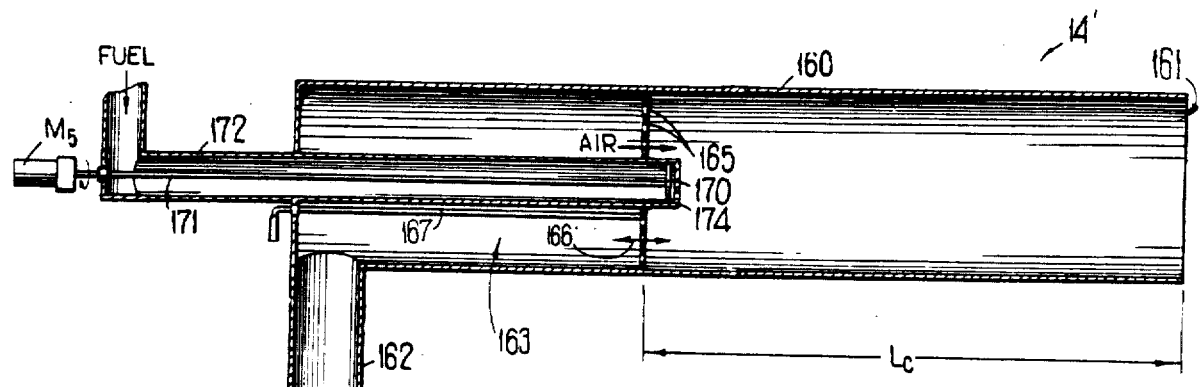

FIG A8

UNITED STATES PATENT AND TRADEMARK OFFICE
CERTIFICATE OF CORRECTION

PATENT NO. : 4,699,588

DATED : October 13, 1987

INVENTOR(S) : Ben T. Zinn and Brady R. Daniel

It is certified that error appears in the above-identified patent and that said Letters Patent is hereby corrected as shown below:

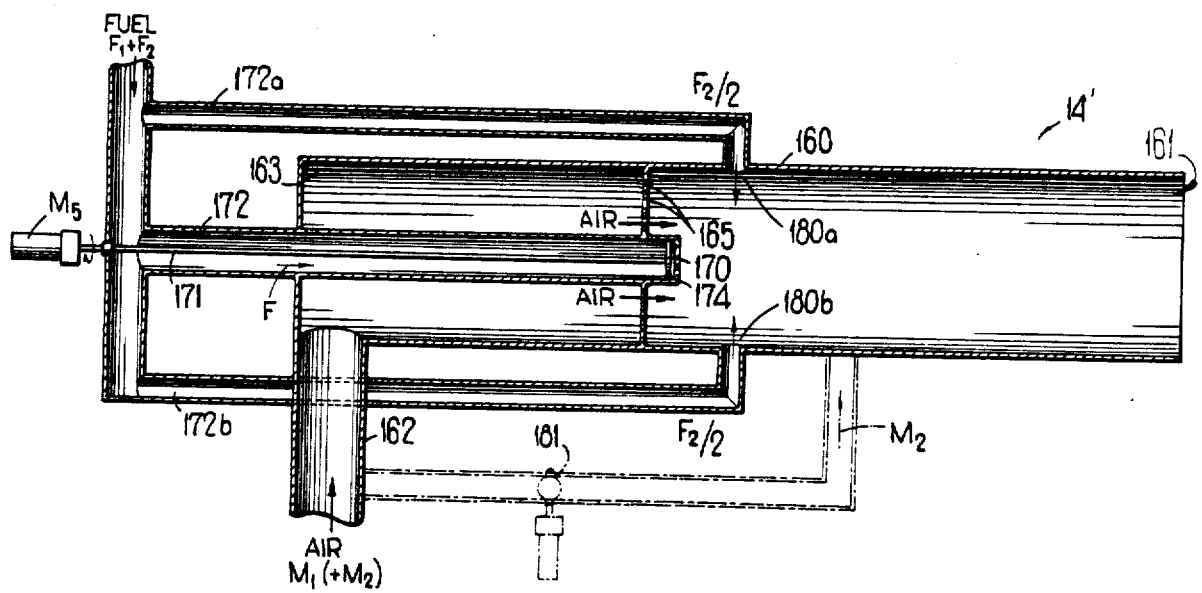

FIG 20